United States Patent [19]

Wang

[11] Patent Number: 5,205,017
[45] Date of Patent: Apr. 27, 1993

[54] NOTEBOOK COMPUTER TOP COVER MOUNTING HARDWARE

[75] Inventor: B. J. Wang, Hsin-Chuang, Taiwan

[73] Assignee: Jetta Computers Co., Ltd., Taipei Hsien, Taiwan

[21] Appl. No.: 853,058

[22] Filed: Mar. 18, 1992

[51] Int. Cl.⁵ .............................................. E05D 3/10
[52] U.S. Cl. ................................ 16/367; 16/DIG. 4; 16/DIG. 41; 16/366
[58] Field of Search ................ 16/DIG. 4, DIG. 41, 16/366, 367

[56] References Cited

U.S. PATENT DOCUMENTS 1,632,564  6/1927  Sayers .......................... 16/DIG. 4
2,754,537  7/1956  Rose et al. ..................... 16/367
4,744,472  5/1988  Pfister ............................ 16/367

Primary Examiner—W. Donald Bray
Attorney, Agent, or Firm—Morton J. Rosenberg; David I. Klein

[57] ABSTRACT

A notebook computer top cover mounting hardware comprising a mainframe having a movable support pivoted to a top edge thereof at one side, and a top cover connected to said movable support by a movable rod and a holding plate for holding a display, wherein engaging a side pin of said movable rod from a first annular groove to a second annular groove inside said holding plate causes said top cover to be rotated through 180° angle for turning said display from a concealed position to the outside for performing a data input operation through a pen device conveniently.

1 Claim, 5 Drawing Sheets

NOTEBOOK COMPUTER TOP COVER MOUNTING HARDWARE

BACKGROUND OF THE INVENTION

The present invention relates to notebook computers. More particularly, the present invention relates to a notebook computer top cover mounting hardware which permits the top cover of a notebook computer can be rotated through 180° angle for showing the display thereof to people at any angle.

A variety of mobile computers have been known and well accepted by computer users for the advantages of mobility. For example, notebook computer is the one. In a notebook computer, the display is generally made on the top cover thereof at the inside so that the total size of the computer can be greatly reduced. However, this arrangement obstructs people from seeing the display from an angle opposed to the operator of a notebook computer. Further, this arrangement is not convenient for data input with a pen device.

SUMMARY OF THE INVENTION

The present invention has been accomplished to eliminate the aforesaid problems. It is therefore an object of the present invention to provide a notebook computer top cover mounting hardware which permits the top cover of a notebook computer to be rotated through 180° angle for changing the display thereof to an opposite side. It is another object of the present invention to provide a notebook computer top cover mounting hardware which permits the operation of data input to be performed through a pen device conveniently. It is still another object of the present invention to provide a notebook computer top cover mounting hardware which is inexpensive to make and durable in use.

According to the present invention, a notebook computer top cover mounting hardware comprises a mainframe which has a movable support pivoted to a top edge thereof at one side, and a top cover connected to the movable support by a movable rod and a holding plate to hold a display. The holding plate comprises a tubular body extending from a flat base, wherein the tubular body has a first annular groove and a second annular groove formed around an inner wall surface thereof at two opposite ends and connected by an elongated groove; the flat base is secured to the movable support at one side. The movable rod has one end fixedly fastened in a hole on the top cover, and an opposite end attached with a side pin. The movable rod is held in the holding plate with the side pin thereof engaged in either annular groove. Moving the side pin of the movable rod from the first annular groove to the second annular groove causes the top cover to be rotated through 180° angle for turning the display from a concealed position to the outside for performing a data input operation through a pen device conveniently.

DETAILED DESCRIPTION OF THE PREFERRED EMBODIMENT

Figure 1:
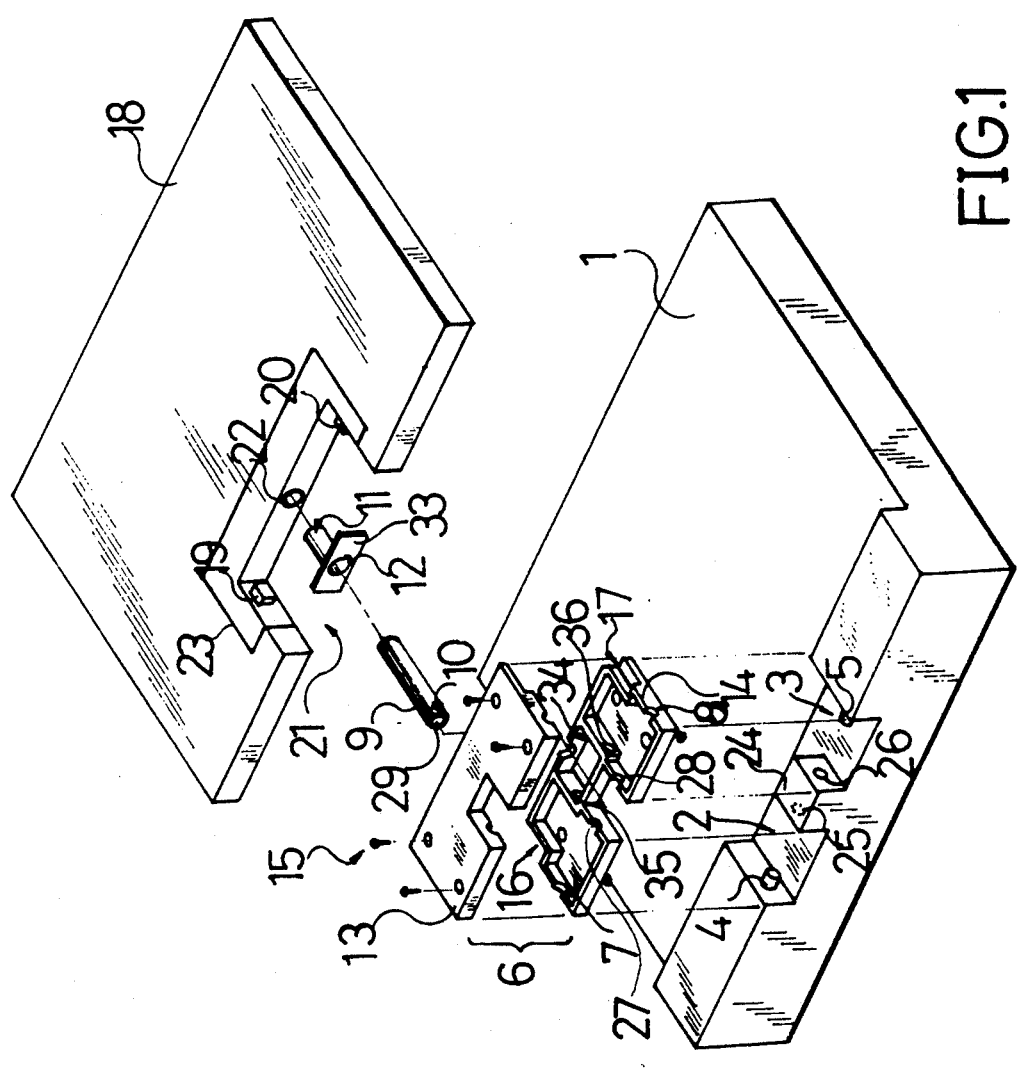
FIG. 1 is an exploded view of the preferred embodiment of the notebook computer of the present invention.
Figure 2A:
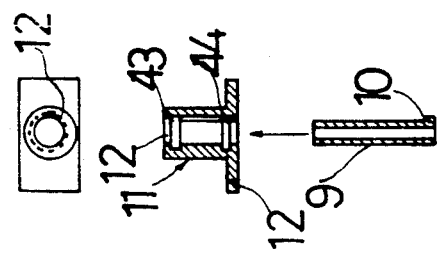
FIG. 2 is a sectional assembly view thereof.
Figure 2:
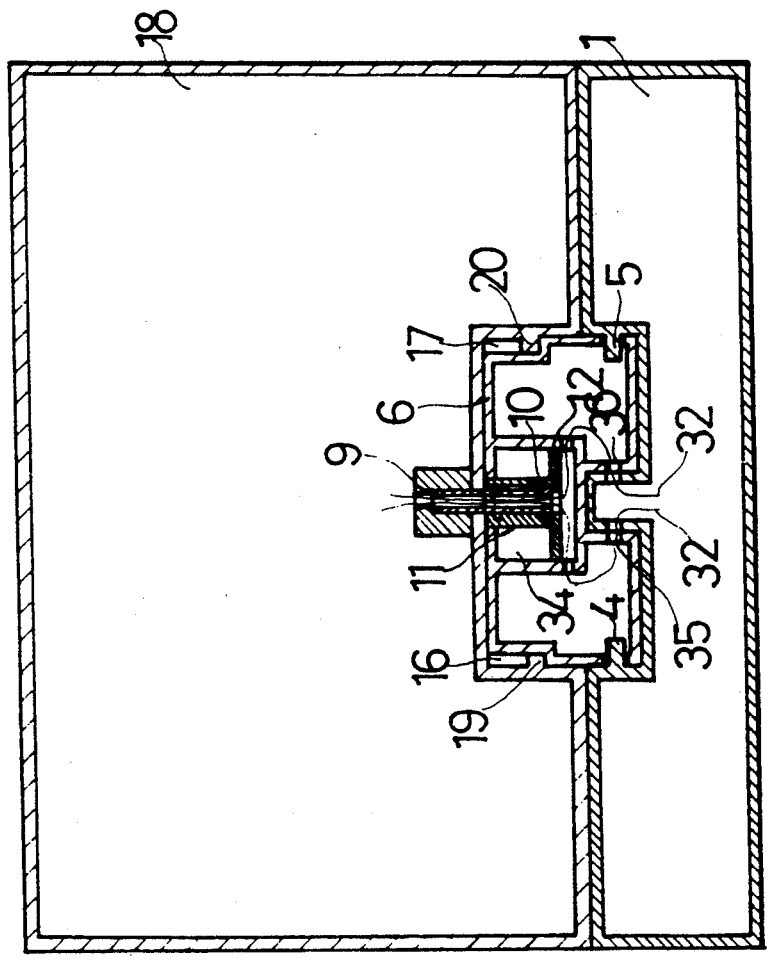
Figure 3:
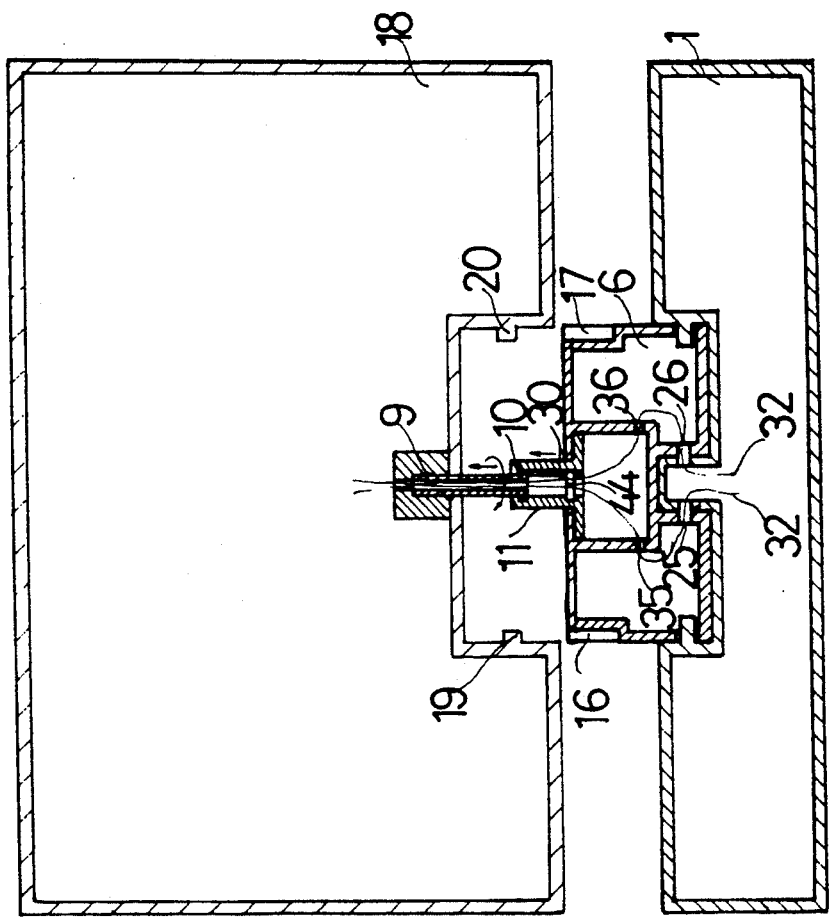
FIG. 3 is another sectional view thereof showing that the top cover has been lifted from the movable support for changing its angular position.
Figure 4:
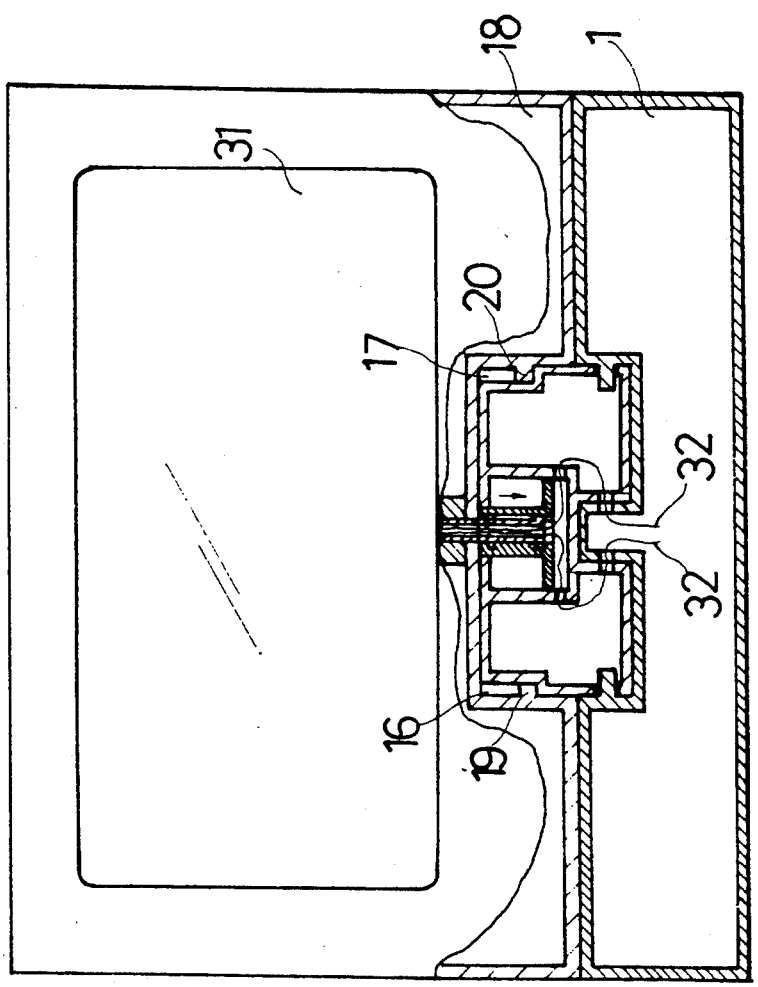
FIG. 4 is still another sectional view thereof showing that the top cover has been rotated through 180° angle to turn the display thereof to the outside.
Figure 5:
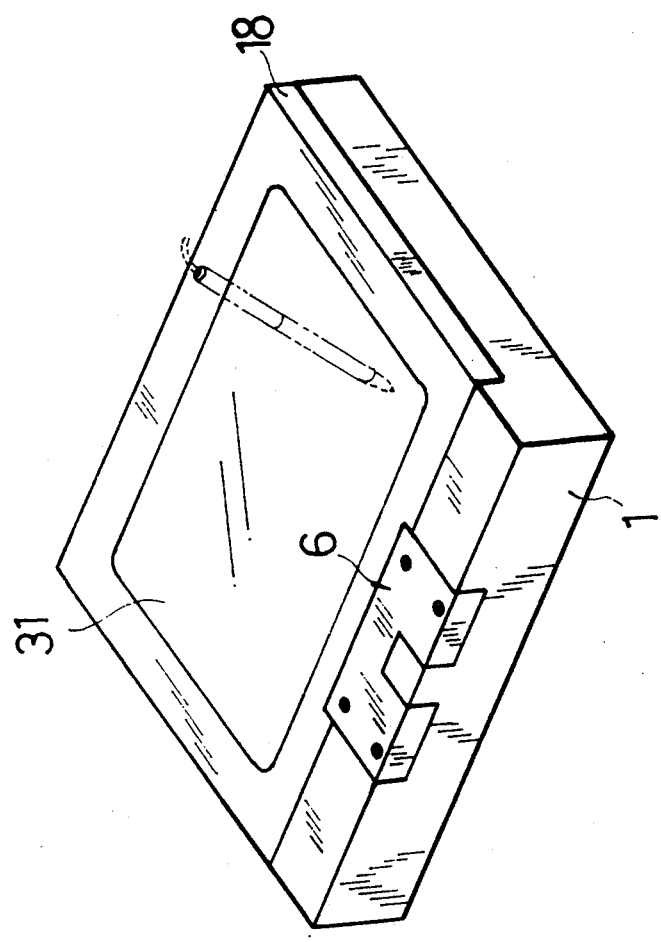
FIG. 5 is an elevation view thereof.

Referring to FIG. 1, the mainframe as indicated at 1 has two adjacent recesses 2, 3 on the top edge thereof at one side separated by a raised block 24. The recesses 2, 3 each has a peg 4 and 5 transversely projecting inwards at an opposite end. The pegs 4, 5 are respectively inserted into holes 7, 8 on two opposite sides of a movable support 6 to secure the movable support 6 to the mainframe 1 permitting it to be rotated thereon. An elongated, round, movable rod 9 which has a side pin 10 at one end is inserted through a hole 12 on a movable rod holding plate 11. The holding plate 11 comprises a rectangular base 33 held in a rectangular slot 34 on the movable support 6. The movable support 6 is consisted of an upper plate 13 and a bottom plate 14. The upper and bottom plates 13, 14 are connected together by screws 15 to firmly secure the holding plate 11 thereto. Two opposite sliding ways 16, 17 are made on the movable support 6 at two opposite sides for supporting two opposed projecting blocks 19, 20 on a top cover 18. The top cover 18 has a rectangular opening 21 on a side thereof attached with a frame 23. The frame 23 may be made from an aluminum alloy. The two opposed projecting blocks 19, 20 are formed on the frame 23 at two opposite locations inside the rectangular opening 21. A hole 22 is made on the frame 23 inside the rectangular opening 21 between the two opposed projecting blocks 19, 20 for fastening the movable rod 9. After having been connected to a movable support 6 by the movable rod 9, the top cover 18 can be pivoted to the mainframe 1. The raised block 24 has wire holes 25, 26 for inserting electric wires 32. The electric wire 32 to be connected between the mainframe 1 and the display 31 on the top cover 18 (see FIG. 4) for data transmission, is inserted through the wire holes 25, 26 on the raised block 24, wire holes 27, 28, 35, 36 on the movable support 6, a hole 29 on the movable rod 9 into the hole 22 on the frame 23 of the top cover 18.

Referring to FIGS. 2, 3, 4 and 5, two annular grooves, namely, an upper annular groove 43 and a lower annular groove 44 are made around the inner wall surface of the holding plate 11 inside the hole 12 thereof at two opposite ends. The movable rod 9 is fastened in the hole 22 on the top cover 18 and held in the hole 12 with its side pin 10 engaged in the lower annular groove 44. Because the holding plate 11 is secured to the movable support 6 and the movable support 6 is pivoted to the mainframe 1, the top cover 18 is pivotably secured to the mainframe 1 by the movable rod 9 via the holding plate 11 and the movable support 6, with the two opposed projecting blocks 19, 20 thereof respectively stopped at the two sliding ways 16, 17. Pulling the movable rod 9 upwards relative to the holding plate 11 causes the side pin 11 to move the side pin 10 along an elongated groove 30 between the upper and lower annular grooves 43, 44, the side pin 10 can be engaged into the upper annular groove 43, and therefore, the top cover 18 can be rotated through 180° angle to turn the display 31 to the outside (see FIG. 4) without being obstructed by the movable plate 6. Then, the movable rod 9 is pushed back to its original position with the side pin 10 engaged into the lower annular groove 44 again. When the top cover 18 is closed, the display 31 is exposed to the outside above the mainframe 1 for performing a data input operation through a pen device conveniently. Because the top cover 18 is rotated through 180° angle, the electric wire 32 between the display 31 and the mainframe 1 will not be twisted.

What is claimed is:

1. A notebook computer top cover mounting hardware comprising:
    a mainframe, said mainframe having two opposite pin holes on two adjacent recesses on a top edge at one side thereof, said recesses being separated by a raised block, said raised block having wire holes for inserting electric wires;
    a top cover, said top cover comprising an opening at one side, two inward projecting blocks alinged at two opposite locations inside said opening, an intermediate hole on a peripheral edge inside said opening between said two inward projecting blocks;
    a movable support pivoted to said mainframe, said movable support being formed of two cover plates, and having two opposite pegs respectively revolvably inserted in said pin hole, and two opposite sliding ways for supporting said two inward projecting blocks;
    a movable connecting tube fixedly fastened in said intermediate hole of said top cover and secured to said movable support by a holding plate;
    wherein said holding plate comprises a tubular body extending from a flat base, said tubular body having a first annular groove and a second annular groove formed around an inner wall surface thereof at two opposite ends and connected by an elongated groove, said flat base being secured to said movable support; said movable connecting tube has one end fixedly fastened in said intermediate hole of said top cover and an opposite end attached with a side pin, said side pin being engaged in either annular groove; and
    wherein moving said side pin of said movable connecting tube from said first annular groove to said second annular groove permits said top cover to be rotated through 180° angle for turning a display thereon to the outside.

* * * * *